United States Patent
Glass et al.

(10) Patent No.: US 10,535,095 B2
(45) Date of Patent: Jan. 14, 2020

(54) SYSTEM AND METHOD FOR DIGITAL DELIVERY OF VOUCHERS FOR ONLINE GIFTING

(71) Applicant: GIFT CARD IMPRESSIONS, LLC, Kansas City, MO (US)

(72) Inventors: Brett R. Glass, Kansas City, MO (US); Dominique Michelle Pierron O'Hara, Kansas City, MO (US); Karl Joseph Geisler, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 0 days.

(21) Appl. No.: 15/442,513

(22) Filed: Feb. 24, 2017

(65) Prior Publication Data

US 2017/0161823 A1 Jun. 8, 2017

Related U.S. Application Data

(63) Continuation of application No. 15/236,130, filed on Aug. 12, 2016, now Pat. No. 9,582,827, and a
(Continued)

(51) Int. Cl.
*G06F 3/01* (2006.01)
*G06Q 30/06* (2012.01)
(Continued)

(52) U.S. Cl.
CPC ......... *G06Q 30/0641* (2013.01); *G06F 3/016* (2013.01); *G06F 3/017* (2013.01);
(Continued)

(58) Field of Classification Search
CPC .. G06Q 30/0641; G06Q 20/40; G06Q 20/409; G06Q 20/12; G06Q 20/351; G06Q 30/02; G11B 27/031
See application file for complete search history.

(56) References Cited

U.S. PATENT DOCUMENTS 7,290,705 B1 * 11/2007 Shin ................. G06Q 20/18
235/379
8,280,825 B2 * 10/2012 Friedman ........... G06Q 30/0601
705/26.1
(Continued)

FOREIGN PATENT DOCUMENTS

WO   WO 2014015365 A1 * 1/2014 ............ G06Q 30/06
WO   WO 2014029026 A1 * 2/2014 ......... G06F 3/04817

OTHER PUBLICATIONS

Microsoft Computer Dictionary Fifth Edition, 2002, Microsoft Press, p. 352.*

*Primary Examiner* — Nicholas Augustine
(74) *Attorney, Agent, or Firm* — Landmark Intellectual Property Law, PLLC

(57) ABSTRACT

An electronic gifting system includes a first computing device that receives voucher information associated with an electronic voucher (e-voucher) to be given to a recipient from a second computing device. The voucher is redeemable for a specified product or service provided by a merchant. The first computing device also receives user-supplied content related to the recipient, and generates the e-voucher in accordance with the voucher information and the user-supplied content. Thereafter, the first computing device displays the generated e-voucher on a recipient computing device in which the e-voucher including imagery that is associated with the specified product or service and the user-supplied content. At least one of the generated e-voucher or an environment in which the e-voucher is displayed is manipulated according to information obtained from one or more sensors configured on the recipient computing device.

18 Claims, 19 Drawing Sheets

Related U.S. Application Data continuation-in-part of application No. 14/822,683, filed on Aug. 10, 2015, now Pat. No. 9,471,144, and a continuation-in-part of application No. 14/231,349, filed on Mar. 31, 2014, now Pat. No. 9,104,237.

(60) Provisional application No. 62/258,759, filed on Nov. 23, 2015.

(51) Int. Cl.

| | | |
|---|---|---|
| *G06F 3/0482* | (2013.01) | |
| *H04N 21/4784* | (2011.01) | |
| *H04N 21/478* | (2011.01) | |
| *H04N 21/431* | (2011.01) | |
| *G06F 16/735* | (2019.01) | |
| *G06F 3/0481* | (2013.01) | |
| *G06F 3/0484* | (2013.01) | |
| *G06F 3/0488* | (2013.01) | |
| *G11B 27/031* | (2006.01) | |
| *G06Q 30/02* | (2012.01) | |
| *G06F 3/00* | (2006.01) | |

(52) U.S. Cl.
CPC .......... *G06F 3/0482* (2013.01); *G06F 3/0484* (2013.01); *G06F 3/04815* (2013.01); *G06F 3/04883* (2013.01); *G06F 16/735* (2019.01); *G06Q 30/0207* (2013.01); *G06Q 30/0601* (2013.01); *G06Q 30/0643* (2013.01); *G11B 27/031* (2013.01); *H04N 21/4312* (2013.01); *H04N 21/4784* (2013.01); *H04N 21/47815* (2013.01); *G06F 3/04842* (2013.01)

(56) References Cited

U.S. PATENT DOCUMENTS

| | | | | |
|---|---|---|---|---|
| 9,659,323 | B2* | 5/2017 | Friedman | G06Q 30/02 |
| 2006/0190332 | A1* | 8/2006 | Grider | B42D 15/045 705/14.27 |
| 2008/0172306 | A1* | 7/2008 | Schorr | G06Q 30/02 705/26.41 |
| 2009/0199275 | A1* | 8/2009 | Brock | G06F 3/04815 726/4 |
| 2010/0017278 | A1* | 1/2010 | Wilen | B42D 15/045 705/14.2 |
| 2011/0010251 | A1* | 1/2011 | Silva | G06Q 30/0277 705/14.73 |
| 2011/0041086 | A1* | 2/2011 | Kim | G06F 3/0488 715/764 |
| 2011/0213675 | A1* | 9/2011 | Friedman | G06Q 30/02 705/26.7 |
| 2011/0289411 | A1* | 11/2011 | Kulkarni | G11B 27/034 715/719 |
| 2012/0245987 | A1* | 9/2012 | Isaacson | G06Q 30/02 705/14.23 |
| 2013/0144733 | A1* | 6/2013 | Rothschild | G06Q 20/0457 705/17 |
| 2013/0325671 | A1* | 12/2013 | Glass | G06Q 30/0641 705/27.1 |
| 2014/0058873 | A1* | 2/2014 | Sorensen | G06F 3/04817 705/26.1 |
| 2014/0074654 | A1* | 3/2014 | Friedman | G06Q 30/02 705/26.7 |
| 2014/0074704 | A1* | 3/2014 | White | G06Q 20/353 705/41 |
| 2014/0081769 | A1* | 3/2014 | Wilen | G06Q 20/354 705/14.66 |
| 2014/0108177 | A1* | 4/2014 | Erke | G06Q 30/0601 705/26.1 |
| 2014/0164159 | A1* | 6/2014 | Lovelace | G06Q 30/0601 705/26.1 |
| 2014/0207659 | A1* | 7/2014 | Erez | G06Q 30/0633 705/39 |
| 2014/0351117 | A1* | 11/2014 | Tran | G06Q 30/02 705/39 |

\* cited by examiner

Fig. 5

Settings

Sign In

Need Help?

Terms of Service

Done

Fig. 6

Sign In

E-mail:
Password:

Sign In

Fig. 7

Register New Account

"Creating an account will save your billing address for future purchases."

E-mail:
Password:
Confirm Password:

Register

Checkout as Guest

◀ Back    Continue ▶

Fig. 8

Recipient Information

Name:
E-mail:

Message ▼

◀ Back    Continue ▶

Fig. 9

Recipient Information

- Recipient Location: _____
- Recipient Age: _____
- 3 Likes/Interests: _____
- Naughty? Why? _____

◀ Back    Continue ▶

Fig. 10

Select a Gift Card

▲

Merchant 1

Merchant 2

Merchant 3

Select a Gift Card

◀ Style 2 ▶

Merchant ID

Select Amount
$50.00 ▼

◀ Back    Continue ▶

Fig. 12

Select an Occasion

- Congratulations
- Birthday
- Wedding
- New Baby
- Back to School
- Just Because
- Graduation
- Holiday Blow out Your Candle To Reveal Your Gift:

Blow out Your Candle To Reveal Your Gift:

Blow out Your Candle To Reveal Your Gift:

$100 GIFT CARD $100

(SHAKING MOVEMENT)

SYSTEM AND METHOD FOR DIGITAL DELIVERY OF VOUCHERS FOR ONLINE GIFTING

RELATED APPLICATIONS

The present application is a continuation of U.S. patent application Ser. No. 15/236,130, entitled "System and Method For Digital Delivery of Vouchers For Online Gifting", filed on Aug. 12, 2016, which claims priority to U.S. Provisional Patent Application No. 62/258,759, entitled "System and Method For Digital Delivery of Vouchers For Online Gifting," filed Nov. 23, 2015. The present application is also a continuation-in-part of U.S. patent application Ser. No. 14/822,683 entitled "System And Method For Digital Delivery Of Reveal Videos For Online Gifting," filed on Aug. 10, 2015, and a continuation-in-part of U.S. patent application Ser. No. 14/231,349, entitled "System And Method For Digital Delivery Of Reveal Videos For Online Gifting," filed on Mar. 31, 2014. The contents of all of the aforementioned applications are incorporated herein by reference in their entirety.

FEDERALLY SPONSORED RESEARCH OR DEVELOPMENT

Not Applicable.

COMPACT DISK APPENDIX

Not Applicable.

FIELD OF INVENTION

The present invention generally relates to online gifting, and more particularly, to a system and method for digital delivery of reveal videos for online gifting.

BACKGROUND

Electronic gifts (e-gifts) such as transaction cards, stored value cards, electronic tickets, gift cards, and stored value cards have become a popular mode of online gifting. For example an e-gift may include a stored value card having a specified cash equivalent value that may be redeemed by a conventional or online merchant. The stored value is determined by the merchant prior to packaging and display for sale or is selected at the point of sale by the purchaser. Nevertheless, these e-gifts, per se, lack any aesthetic qualities that may be useful for enhancing online gifting experiences. Additionally, the online gifting of e-gifts often does not adequately convey a sentiment that a giver would like to provide to his or her recipient. It is with these features in mind that embodiments of the present disclosure have been developed.

SUMMARY

According to one aspect of the present disclosure, an electronic gifting system includes a first computing device that receives voucher information associated with an electronic voucher (e-voucher) to be given to a recipient from a second computing device. The electronic voucher is an redeemable for a specified product or service provided by a merchant. The first computing device also receives user-supplied content related to the recipient, and generates the e-voucher in accordance with the voucher information and the user-supplied content. Thereafter, the first computing device displays the generated e-voucher on a recipient computing device in which the e-voucher including imagery that is associated with the specified product or service and the user-supplied content. At least one of the generated e-voucher or the environment in which the e-voucher is displayed is manipulated according to information obtained from one or more sensors configured on the recipient computing device.

BRIEF DESCRIPTION OF THE DRAWINGS

FIG. 5 illustrates an example of a settings page of a user interface according to an aspect of the e-gift ordering system.

FIG. 6 illustrates an example of a sign in screen of a user interface according to an aspect of the e-gift ordering system.

FIG. 7 illustrates an example of a registration screen of a user interface according to an aspect of the e-gift ordering system.

FIG. 8 illustrates an example of a recipient information entry screen of a user interface according to an aspect of the e-gift ordering system.

FIG. 9 illustrates an example of a recipient information entry screen of a user interface according to an aspect of the e-gift ordering system.

FIG. 10 illustrates an example of an e-gift selection screen of a user interface according to an aspect of the e-gift ordering system.

FIG. 11 illustrates an example of an e-gift customization screen of a user interface according to an aspect of the e-gift ordering system.

FIG. 12 illustrates an example of an occasion selection screen of a user interface according to an aspect of the e-gift ordering system.

DETAILED DESCRIPTION

Although e-gifts have become a commonly accepted gifting medium, their use has not been without limitation. For example, conventional e-gifts are generally impersonal in that they typically do not include any personal sentiment that the user (i.e., sender) would like to convey to his or her recipient. Embodiments of the present disclosure provide a solution to this problem using an e-gift or e-gift card ordering server that generates a reveal video to be electronically sent along with an e-gift card that embellishes upon a gifting experience for a recipient.

In addition to electronic gift cards that may be used for the purchase of any good or service from a merchant or provider, the present application is generally directed towards the creation, issuance, transmission, and interactive display of electronic vouchers (e-vouchers). As used herein e-vouchers are redeemable for a specified product or service provided by a merchant. After the e-voucher is purchased and transmitted to the recipient, the generated e-voucher, a graphical environment in which the e-voucher is displayed, or both, may be manipulated by the recipient to enhance the gift giving experience. As used herein e-voucher and e-gift may be used interchangeably, where the value and redemption of each is for a specified product or service.

Figure 1A:
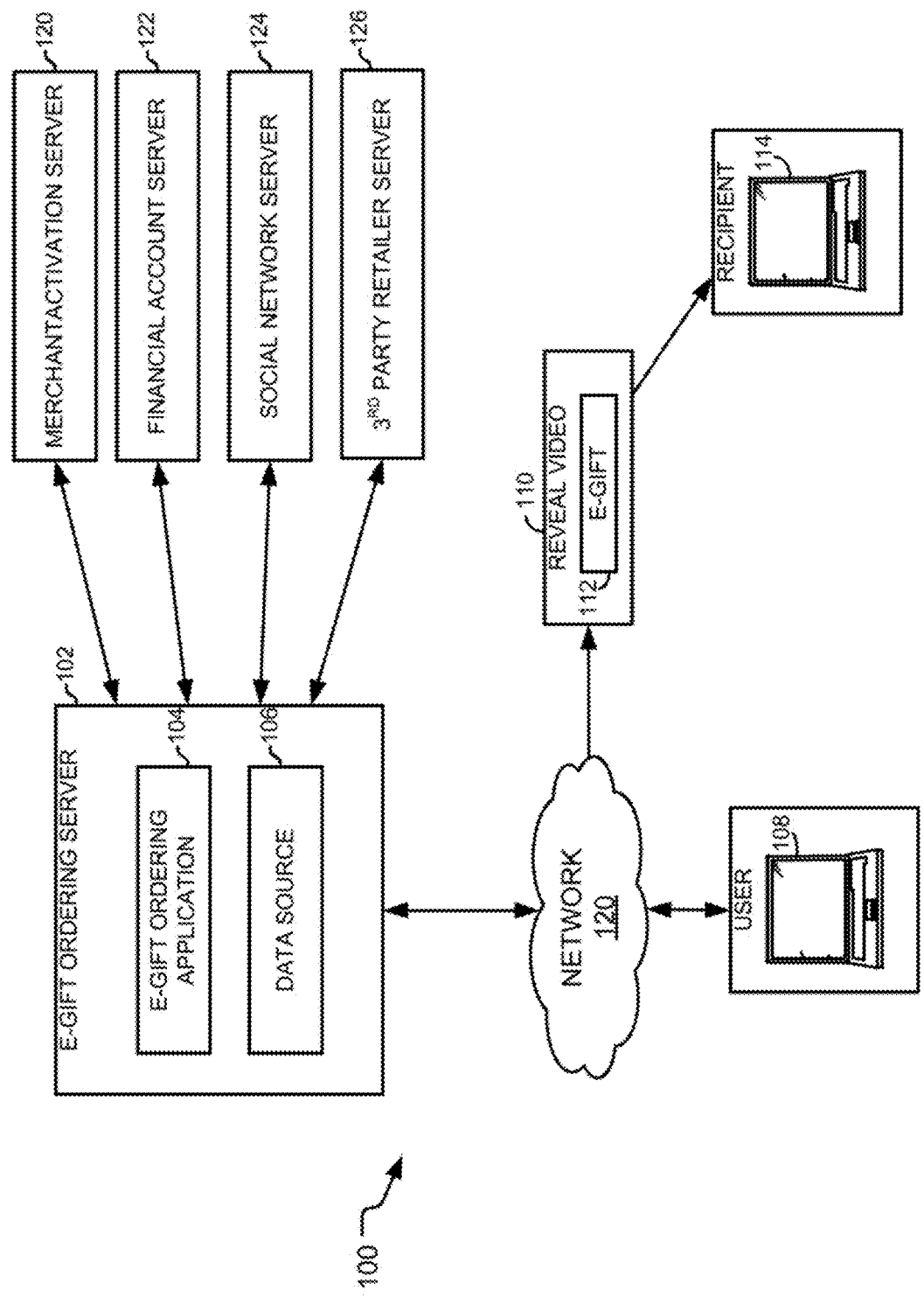
FIG. 1A is a block diagram of a computing system that includes an e-gift ordering server according to an aspect of the e-gift ordering system.
Figure 1B:
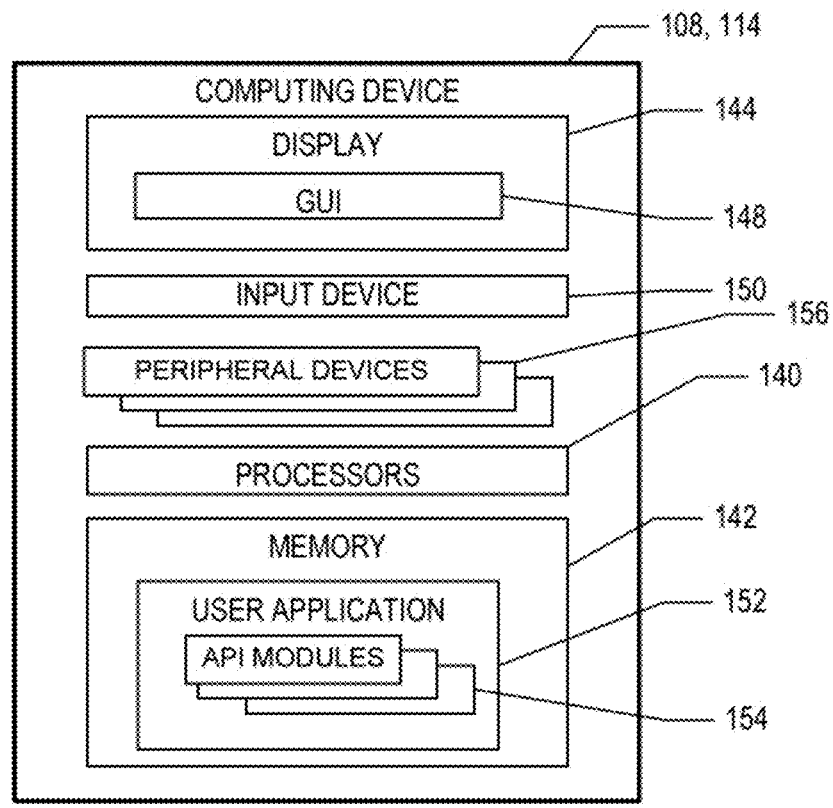
FIG. 1B depicts an exemplary embodiment of a computing device according to one aspect of the e-gift ordering system.
Figure 1C:
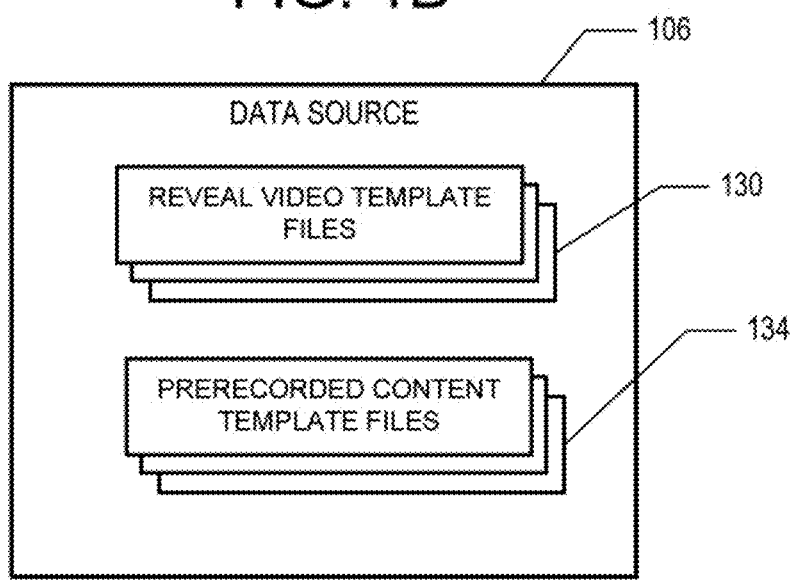
FIG. 1C depicts an exemplary embodiment of a data source according to an aspect of the e-gift ordering system.

FIGS. 1A through 1C depict an example e-gift ordering system 100 according to aspects of the disclosure. The system 100 includes an e-gift ordering server 102 that includes an e-gift ordering application 104 and a data source 106. As will be described in detail below, the e-gift ordering application 104 receives information from a computing device 108 of a user, and generates a reveal video 110 for transmission to a recipient along with a selected e-gift 112. The reveal video/e-gift combination is transmitted, for example, to a computing device 114 of the recipient via a messaging service, such as e-mail, a short message service (SMS), or a multimedia message service (MMS), or other suitable digital communication medium.

The server 102 communicates with a merchant activation server 120 to activate the e-gift, and a financial account server 122 that is associated with a financial account of the user to provide payment for the activated e-gift by the user. The financial account is any type, such as a credit card account, a debit card account, a mobile payment system account (e.g., GOOGLE WALLET™ account), or a PAYPAL™ account of the user. Prior to activation of the e-gift, the server 102 facilitates a financial transaction between the merchant activation server 120 and the financial account server 122 associated with the user to provide payment for the e-gift.

The server 102 communicates with a social network server 124 to obtain information about the user and/or recipient for suggesting additional content to be included with the reveal video/e-gift combination. The server 102 also communicates with a third party retailer server 126 to provide generation, customization, and transmission of reveal videos 110 for a third party retailer. Additionally, the server 102 communicates with the social network server 124 to obtain information/data about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with any e-gift/reveal video designs related to anniversaries so that the user can optionally select a particular gift card/reveal video design to send to the friend (e.g., recipient).

The merchant activation server 120, the financial account server 122, the social network server 124, and the third party retailer server 126 each have one or more processors and executable instructions stored in volatile and/or non-volatile memory for performing the actions and/or steps described herein.

The data source 106 stores information that is used by the sender to activate an e-gift, and generate a customized reveal video 110 to be sent to the recipient. In the particular embodiment shown, the data source 106 stores one or more reveal video template files 130, and one or more pre-recorded content files 134. In other embodiments, the data source 106 stores any suitable type of information for personalizing the reveal video by the user. Although the data source 106 is shown as being located on, at, or within the server 102, it is contemplated that the data source 106 can be located remotely from the server 102 in other aspects of the system 100, such as on, at, or within a database of a data management system or a database of another computing device or system having at least one processor and volatile and/or non-volatile memory.

Although not shown, the data source 106 may also store information to be used for generating other forms of content to be transmitted to the recipient. For example, the data source 106 may store information for generating an electronic gift card holder (e-gift card holder), and/or a teaser video to be transmitted along with the e-gift to the recipient. Examples of such a system is described in U.S. patent application Ser. No. 13/940,436, entitled Gift Card Ordering System and Method, which was filed on Jul. 12, 2013, the contents of which are incorporated by reference in its entirety.

The communication network 120 can be the Internet, an intranet, or another wired and/or wireless communication network. In one aspect, one or more of the server 102 and the computing device 108 communicate with one another using any suitable protocol or messaging scheme. For example, the server 102 and computing device 108 communicates using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing device 108 through a network, other embodiments contemplate the server 102 communicating directly with the computing device 108 without the use of a separate and a distinct network. Additionally, other embodiments contemplate that the modules employed by the server 102 and the computing device 108 are integrated in one computing system. Further, the servers 120, 122, and 124 alternatively communicate with the merchant activation server 102 via the network 120.

The user accesses the system 100 via the computing device 108 hosted by the e-gift ordering server 102 using an HTML link or other suitable entry point, such as through application software (i.e., a mobile app) executed on a portable computing device, such as a wireless communication device. The e-gift ordering application 104 then generates a digital reveal video 110/e-gift 112 combination that is digitally transmitted to the recipient using an e-mail message, a short message service (SMS), via a social media account, or other suitable digital communication medium. The reveal video 110, when played by the computing device 114 of the recipient, receives one or more user interface input actions and in response, generates one or more tactile feedback actions on the computing device 114 for simulating a gifting experience for the recipient.

The reveal video 110 may be incorporated in multimedia display or in any suitable format that provides a multimedia viewing experience for the recipient. For example, the reveal video 110 may include audio and recorded video content obtained from a camera and stored in a format such as a motion picture experts group 3 (MPEG-3) format, a MPEG-4 format, a H.265 format, or an OGG multimedia format. The reveal video 110 may also include animated video content such as may be stored and displayed in a HTML5 format. Additionally, the reveal video 110 may include a combination of recorded video content and animated video content using a combination of formats discussed herein above.

FIG. 1B depicts an example embodiment of a computing device 108, 114 that may be used by a user (i.e., giver) and a recipient, respectively, according to one aspect of the e-gift ordering system 100. The computing device 108, 114 is a computing or processing device that includes one or more processors 140 and memory 142. For example, the computing device 108, 114 can be a personal computer, such as a laptop or notebook computer, a workstation, or other processing device such as a personal digital assistant or a tablet computer. The computing device 108, 114 includes a display 144, such as a computer monitor, for displaying data and/or a graphical user interface 148. The computing device 108, 114 also includes an input device 150, such as a keyboard or a pointing device (e.g., a mouse, trackball, pen, or touch screen) to enter data into or interact with the graphical user interface 148. In one embodiment, the display 144 comprises a touch-screen device in which input is provided via contact by the user with the touch-screen device. The computing device 108, 114 receives data and/or communications from, and/or transmit data and/or communications to, the server 102 via the communication network 120.

The computing device 108, 114 includes a user application 152 stored in the memory 142 and executed on the processors 140 to generate the graphical user interface (GUI) 148 to the display 104. The graphical user interface 148 enables the computing device 108, 114 of the user to interact with one or more data entry forms received from the server 102 to enter order detail data and submit orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 152 includes application software (i.e., a mobile app) that is executed on the computing device 108, 114, which is, for example, a wireless communication device for providing one or more selectable fields, edit screens, and the like for selecting content and/or modifying pre-recorded content by the user.

According to an aspect of the present disclosure, the user application 152 also includes one or more application program interface (API) modules 154 for communicating with one or more peripheral devices 156 configured in the computing device 108, 114. For the computing device 114 of the recipient, the API modules 154 include any type that receives user interface input actions, and generates tactile feedback using one or more peripheral devices 156. For the computing device 108 of the user, the API modules 154 may receive user-supplied content from the user for generating the reveal video 110. For example, the API modules 154 of the computing device 114 of the recipient may communicate with sensors for sensing finger gestures performed by the recipient and cooperate with one or more other API modules 154 for generating tactile feedback for the recipient using peripheral devices (e.g., speaker, vibration generators, or rumble feedback generators). As another example, the API modules 154 may include a keyboard for receiving alphanumeric text information from the user, a microphone for receiving audio content from the user, and/or a camera for receiving photographic or video content from the user.

Figure 2:
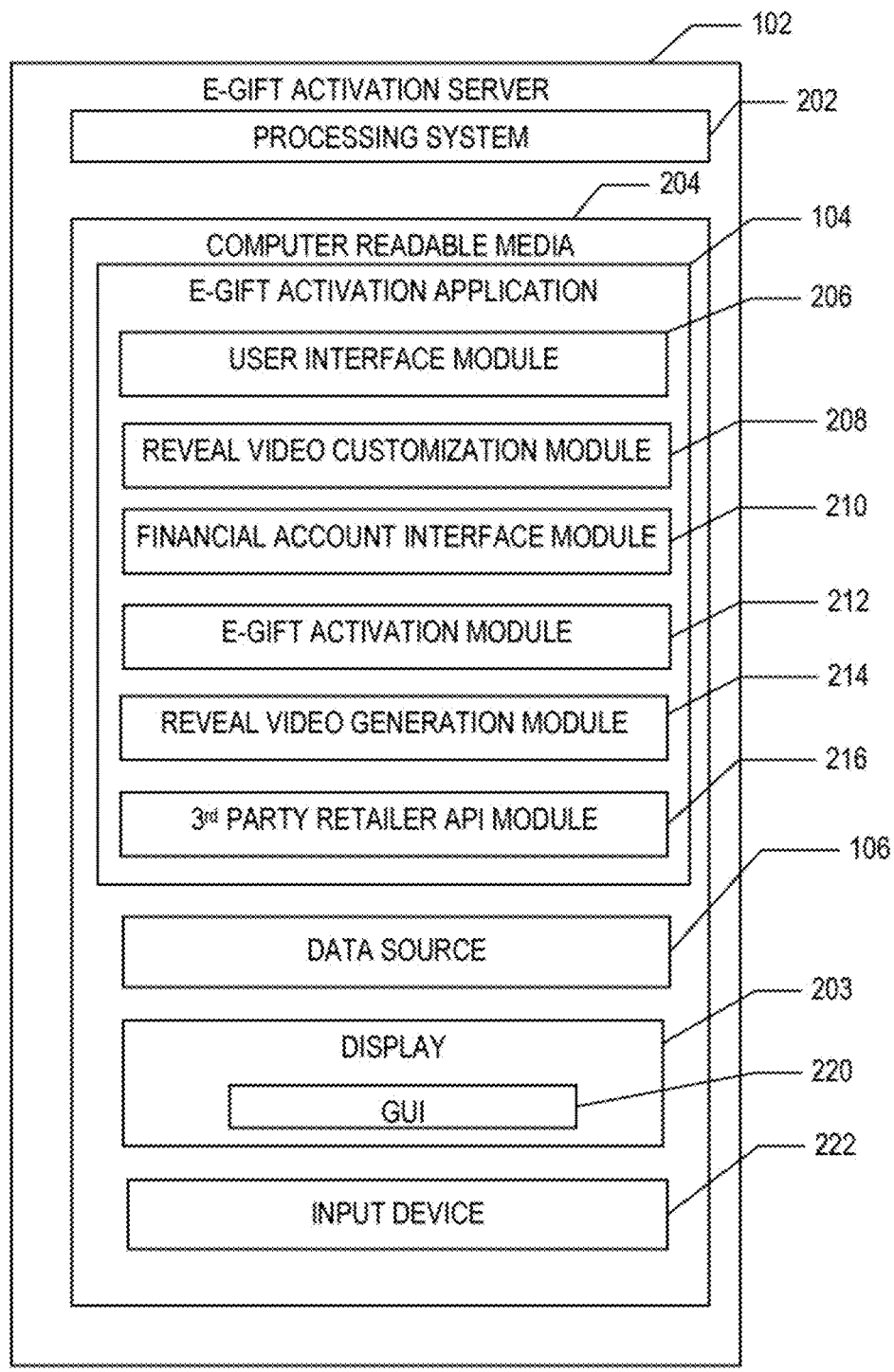
FIG. 2 is a block diagram of a computing system that executes an e-gift ordering application according to an aspect of the e-gift ordering system.

FIG. 2 illustrates an example e-gift ordering application 104 executed on the e-gift ordering server 102. The e-gift ordering server 102 includes a processing system 202 that includes one or more processors or other processing devices. A processor is hardware. The processing system 202 executes the e-gift ordering application 104 to facilitate activation of an e-gift and for receiving customized information from the user for generating a reveal video that is combined with the e-gift to be sent to a recipient. The e-gift ordering server 102 also includes a display 203, such as a computer monitor, for displaying data and/or a graphical user interface 220.

According to one aspect, the e-gift ordering server 102 includes a computer readable medium 204 that stores the e-gift ordering application 104. The e-gift ordering application 104 includes instructions or modules that are executable by the processing system 202 to generate a reveal video to be sent to a recipient along with a selected e-gift.

The computer readable medium 204 includes volatile media, nonvolatile media, removable media, non-removable media, and/or another available medium that can be accessed by the e-gift ordering server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the computing device 108 of the user. In one example, the user interface module 206 communicates with the computing device 108 using a web browser executed on the computing device 108 to provide one or more selectable fields, editing screens, and the like for receiving content and/or modifying pre-recorded content by the user (i.e., sender) to be included in the reveal video 110. In another example, the user interface module 206 communicates with the computing device 108 using application software (i.e., a mobile app) executed on a computing device 108, such as a wireless communication device or tablet computer, to provide one or more selectable fields, editing screens, and the like for receiving content and/or modifying pre-recorded content by the user (i.e., sender). In yet another example, the user interface module 206 communicates with one or more peripheral devices 156 of the computing device 108 to receive user-supplied content to be included on the reveal video and/or the gift card.

A reveal video customization module 208 receives information from the computing system 108 for customizing a reveal video 110. For example, the reveal video customization module 208 displays one or more reveal video templates stored in the data storage and receives selection of one of the displayed reveal video templates by the user. Next, the reveal video customization module 208 receives other information from the computing device 108 of the user for customizing the reveal video, which may include, for example, selection of a particular color scheme to be associated with the reveal video, entry of user-supplied content, and/or selection of one or more pre-recorded content to be included with the reveal video. For example, the reveal video customization module 208 receives user selection of a holder type including a particular design associated with a special occasion, which is, for example, a birthday, wedding, or a holiday, such as Christmas, Easter, Thanksgiving, and the like. The user-supplied content may include alphanumeric text, photographs, audio content, recorded video content, and/or animated video content as provided by the user. For example, the reveal video customization module 208 receives textual content from the user that includes a sentimental message to be included in the reveal video to be viewed by the recipient.

The user-supplied content or pre-recorded content may include textual, audio, photographs, and/or video segments to be included with the reveal video. In a particular embodiment, the user-supplied content includes pre-recorded content including a song or a portion of a pre-recorded song that is copyrighted and licensed by the owner of the copyrighted song. The reveal video customization module 208 modifies existing content, such as pre-recorded content or other previously received content, based upon input received from the computing system 108. An example of modifying existing content includes modifying a received photograph using one or more photograph editing features that provides for cropping, color hue adjustment, brightness adjustment, sizing, and/or other features associated with manipulation of digital imagery.

A financial account interface module 210 communicates with a payment processing server, such as the financial account server 122, to transact a monetary transfer of funds from the user's financial account to a financial account of a merchant of the e-gift. In one example, the financial account module 210 includes an application program interface (API) for coordinating a monetary transaction (e.g., online money transfer) through an e-commerce provider, such as PAYPAL™, online credit card systems, or other suitable third party financial clearing entity. In another example, the financial account interface module 210 encodes monetary transaction information provided by the user and transmits this information to the merchant activation server 120 such that the merchant activation server 120 may communicate with the financial account server 122 of the user for transacting funds necessary for activating the e-gift.

The e-gift activation API module 212 communicates with the merchant activation server 120 for activation of the e-gift. For example, the merchant activation server 120 is a server managed by a merchant associated with the e-gift. For another example, the merchant activation server 120 is a third party server of a third party e-gift activation service for activation of the e-gift, such as SVS™ STORE FINANCIAL™, and the like.

A reveal video generation module 214 facilitates the generation of the reveal video to be sent to the recipient along with the selected e-gift. For example, the e-gift/reveal video combination is generated in digital form and transmitted to the recipient via any suitable communication mechanism, such as via an e-mail message, or a short message service (SMS) message.

A third party retailer API module 216 exposes certain features of each of the user interface module 206, the reveal video customization module 208, the financial account interface module 210, the e-gift activation API module 212, and/or the reveal video generation module 214 for use by the third party server 126 so that reveal videos 110 may be generated and transmitted to recipients using a website platform owned and managed by a third party retailer. For example, a third party, such as WAL MART™ may provide a publicly available website that allows its users to place orders for e-gifts 112, while also interfacing with the modules 206, 208, 210, 212, and/or 214 to select, customize, generate, and transmit e-gift/reveal video combinations directly from their website.

In one embodiment, the third party retailer API module 216 may store value information and region information associated with products or services be provided by merchants in differing regions. Accordingly, the system may provide for selection of those products or services by the user according to the region where the user is located at. For example, when the user selects a particular product from a merchant having a nationwide presence, the third party retailer API module 216 may obtain region information about where the user or the recipient is located at, and based on that information, provide selection of the product at a price based on that geographical region. Additionally, the third party retailer API module 216 may include region information in the e-voucher such that it is restricted to being redeemed only within that geographical region. In such a case, if a user living in the mid-west purchases an e-voucher for a certain specified amount, a recipient of the e-voucher may be restricted from redeeming the e-voucher on the east coast where the price for the product is greater than the same product in the mid-west. In one aspect, the location of the recipient may be used to determine the value amount for the e-voucher. The value or range of values for goods and services may be stored in one or more databases that may correspond to different geographical regions. The geographical regions may correspond to any municipal or territory size. For example, the geographical regions in the database may be granular to account for price variations in different portions of the same city. This may be accomplished based on ZIP codes, mailing or physical addresses or other information. Alternately, the database may group geographical regions by state, province, or country. In one embodiment, the database values are updated at a desired interval by referring to a cost of living index, retailer press releases, or any other media that may indicate the current or future price for a good or service.

It should be appreciated that the modules described herein is provided only as an example of a computing device that executes the e-gift ordering application 104 according to the teachings of the present invention, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the computing device 108 used by the user, or the computing device 114 used by the recipient.

Figure 3:
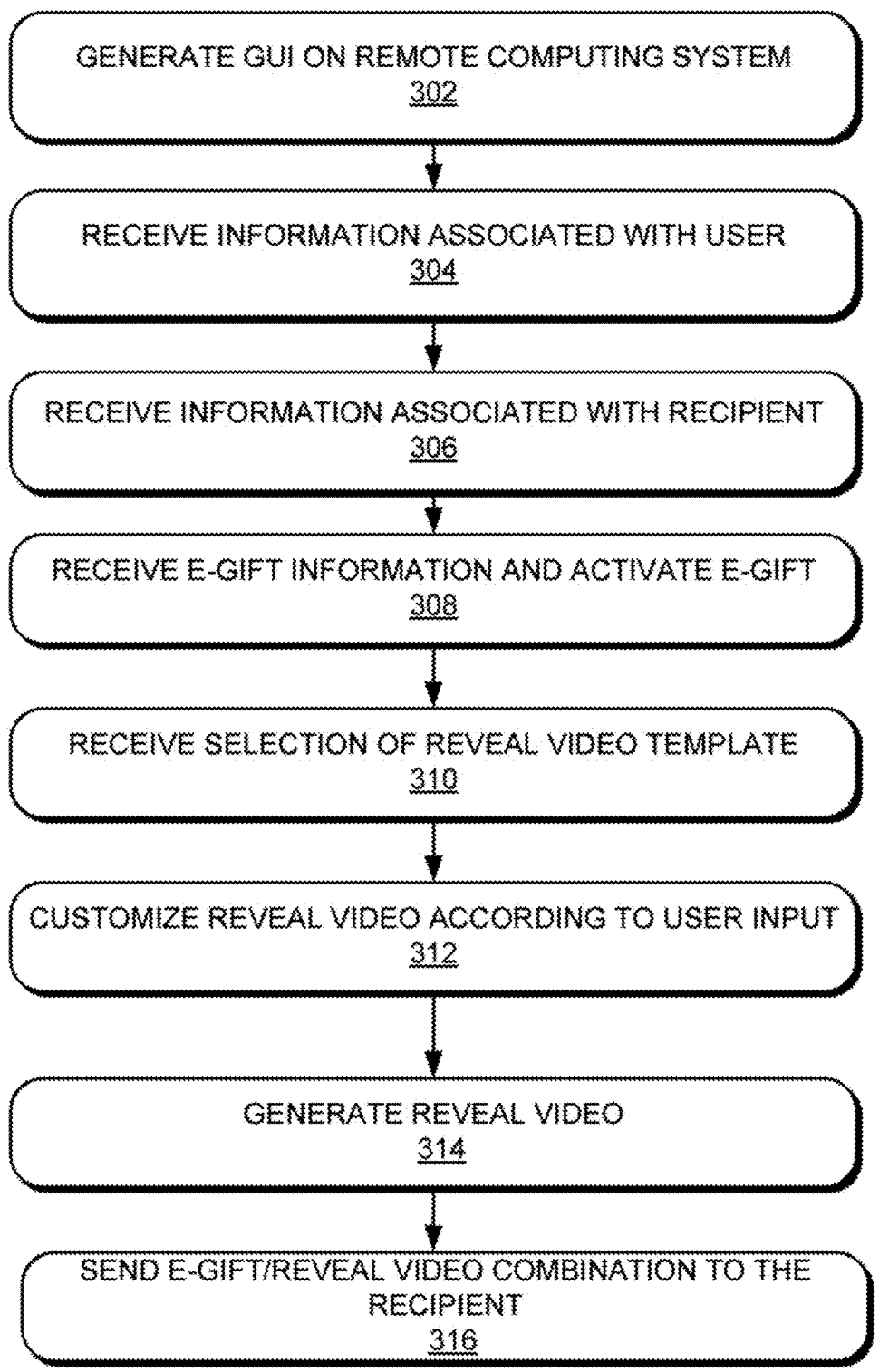
FIG. 3 is a flowchart depicting a process for creating a personalized reveal video according to an aspect of the e-gift ordering system.

FIG. 3 illustrates an example process that is performed by the e-gift ordering application 104 to generate a reveal video that may be transmitted, along with a selected e-gift to a recipient according to the teachings of the present disclosure.

At 302, the e-gift ordering application 104 receives a request from a computing device 108 and generates a GUI on the computing system 108 of the user. In one embodiment, the GUI is generated as a web page that is rendered by a web browser executed on the computing device 108 through a network, such as the Internet. In another embodiment, the GUI is generated by application software (i.e., a mobile app) designed to be executed on a computing device 108 embodied as a wireless communication device, a tablet computer, or other similar type of portable computing device.

The user accesses the system 100 via the computing device 108 via the user interface of the computing device 108 hosted by the e-gift ordering server 102. A user may arrive at the system interface via an HTML link or other suitable entry point, such as through a mobile app executed on a portable computing device. The user typically initiates the online personalized gifting transaction by requesting a URL of the server 102 through a browser or by launching the mobile app on a portable computing device, such as a wireless communication device or portable tablet computer from which the GUI is generated on the computing device 108.

In some embodiments incorporating a mobile app that is executed on a portable computing device, a first or main screen display is provided showing elements such as text and graphics describing and explaining use of the system. The main screen may also display one or more banners showing seasonal offers provided to the user. In certain embodiments, the user can scroll through multiple banners using a finger swipe or other means, such as arrow keys, provided by the portable computing device for controlling and interacting with the mobile app executed on the portable computing device. Typically, the main screen also includes text and graphics comprising a primary navigation element, such as a "Get Started" button, that is activated by a screen touch or other selection means provided by the mobile device to advance the user to the next screen.

Figure 4:
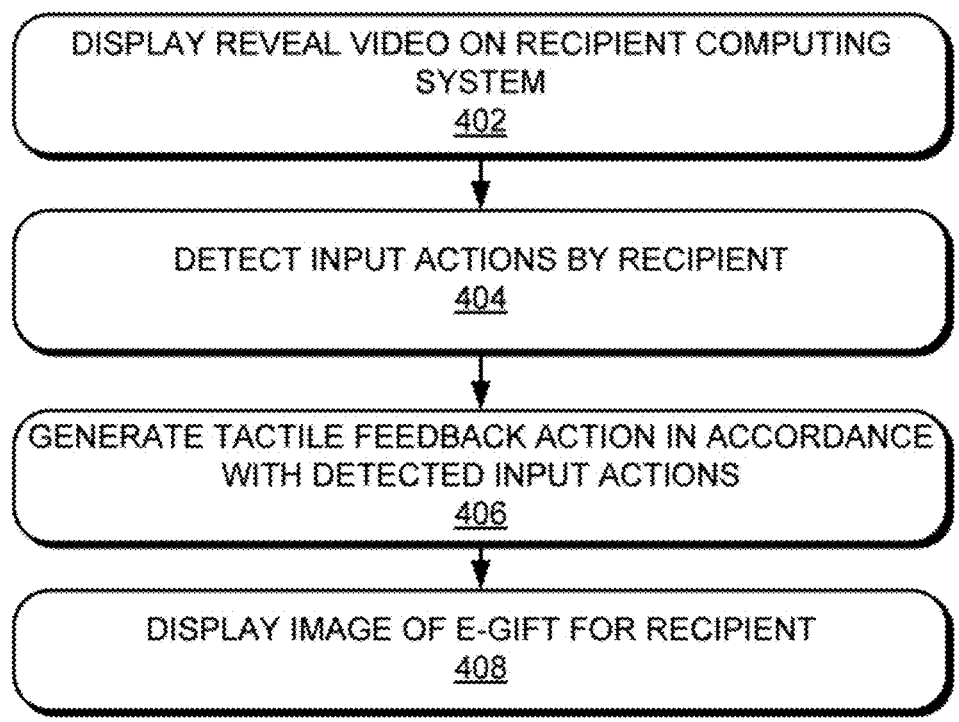
FIG. 4 is a flowchart depicting a process for playing the reveal video on a computing device of a recipient according to one aspect of the e-gift ordering system.
Figure 13:
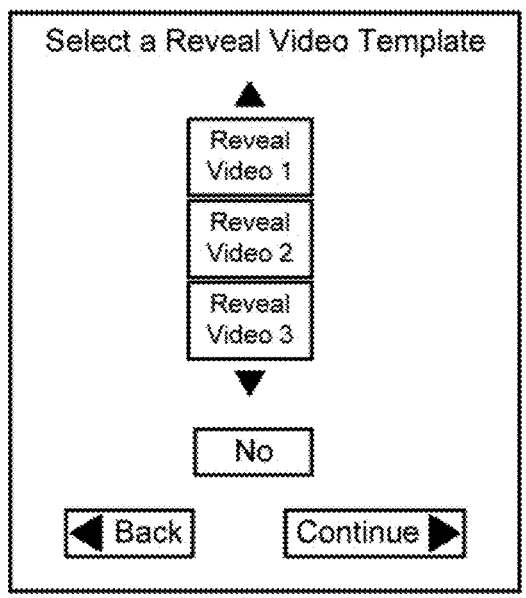
FIG. 13 illustrates an example of a reveal video selection screen of a user interface according to an aspect of the e-gift ordering system.
Figure 14:
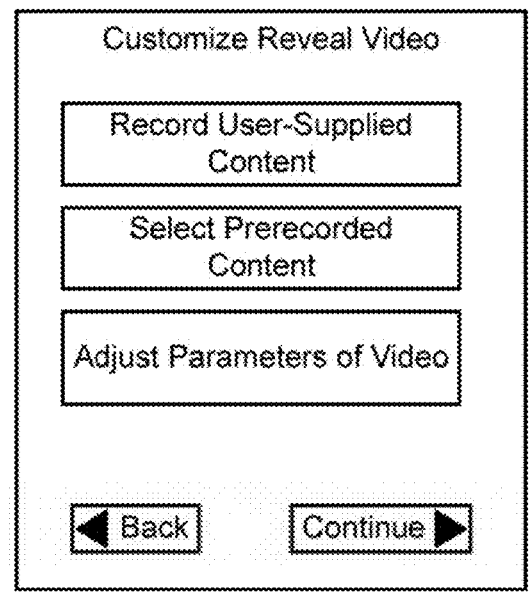
FIG. 14 illustrates an example of a reveal video customization screen of a user interface according to an aspect of the e-gift ordering system.
Figure 15:
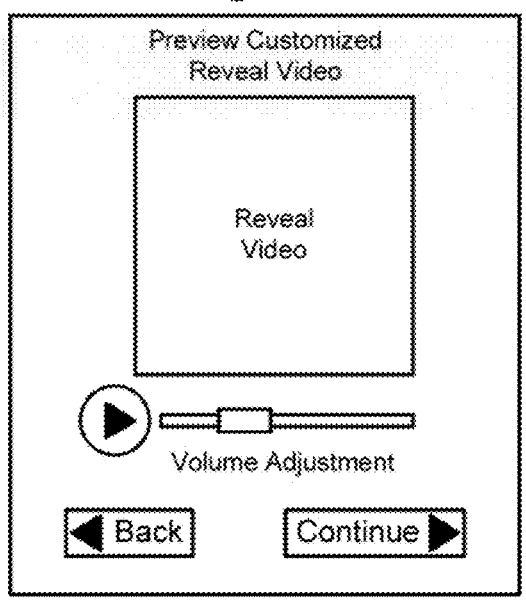
FIG. 15 illustrates an example of a reveal video preview screen of a user interface according to an aspect of the e-gift ordering system.

At 304, the e-gift ordering application 104 receives information associated with the user. For example, the e-gift ordering application 104 generates a splash screen (FIG. 4) on the computing device from which a sign-in screen (FIG. 5) is accessed by the computing device. In the event that the user has not yet established an account, the e-gift ordering application 104 generates a registration screen (FIG. 6) on the computing device for registration of the user. In other embodiments, information associated with the user without the splash screen, sign-in screen, and registration screen as shown in FIGS. 4-6, respectively if registration of the user is not needed or desired. It is important to note that the screens of FIGS. 5-24 of the present disclosure may refer to screens generated by a mobile app on a computing device, such as smartphone as well as screens generated by a web browser on a computing device, such as a home computing system.

At 306, the e-gift ordering application 104 receives information associated with a recipient. For example, the e-gift ordering application 104 generates a recipient information screen (FIG. 7) to receive one or more identifying elements of the recipient from the user. The e-gift ordering application 104 also generates a second recipient information screen (FIG. 8) to receive one or more other elements of information of the recipient, such as a location where the recipient resides, an age of the recipient, and any interests of the recipient. It is important to note that FIGS. 7 and 8 merely show one embodiment of recipient information that is received by the e-gift ordering application 104; other examples however, provides for receipt of any type of recipient information. Alternatively, the e-gift ordering application 104 obtains personal information of the recipient using one or more social network sites, such as FACEBOOK™. As will be described in detail below. The e-gift ordering application 104 uses this information to provide targeted suggestions to the user for designing the reveal video and/or selection of a e-gift.

At 308, the e-gift ordering application 104 receives e-gift information from the computing device 108 and facilitates activation of the e-gift. For example, the e-gift ordering application 104 may present a merchant selection screen (FIG. 9) for entry of a particular merchant of the e-gift, which upon selection by the user, then displays an e-gift selection screen (FIG. 10) and an e-gift customization screen (FIG. 11), which in this particular example is configured to provide for selection and customization of a gift card of the selected merchant. The e-gift selection screen also provides for selection of a monetary value to be associated with the e-gift. Although the present example describes an e-gift in the form of a gift card, it should be understood that the e-gift may be any type that facilitates an item of value or facilitates a financial transaction for the recipient, such as a transaction card, a stored value card, an electronic ticket, or a stored value card, a subscription, a coupon, an e-book, a group coupon e.g., GROUPON™), and the like.

At 310, the e-gift ordering application 104 receives reveal video information from the computing device 108. For example, the e-gift ordering application 104 presents an occasion screen (FIG. 12) for entry of a particular occasion by a user of the computing device 108. As another example, the e-gift ordering application 104 presents a reveal video template selection screen (FIG. 13) for selection of a particular reveal template to be customized. For a particular example in which the selected occasion is Christmas, the e-gift ordering application 104 presents multiple reveal video templates associated with the Christmas season, such as a manger scene, a Christmas tree, three wise men, and the like. The e-gift ordering application 104 receives a selected occasion from the computing device 108 of the user for further customization.

At 312, the e-gift ordering application 104 customizes the reveal video according to reveal information provided by the user. For example, the application 104 presents a reveal video customization screen (FIG. 14) to manage the entry of reveal video information by the user. For example, the interactive screen includes a "Record User-Supplied Content" button that when selected, allows the user to enter user-supplied content, such as textual, audio, photographic, and/or video content to be included in the reveal video. As another example, the interactive screen includes a "Select Prerecorded Content" button that when selected, allows the user to select from among multiple instances of prerecorded content stored in the data source. As yet another example, the interactive screen includes a "Adjust parameters of the Video" button that when selected, allows the user to adjust one or more parameters of the reveal video, such as a color scheme to be associated with the reveal video, a play time of the reveal video, haptic feedback intensity parameters to be associated with the reveal video, and the like. The e-gift ordering application 104 also displays a reveal video preview screen (FIG. 15) that displays a preview of the customized reveal video so that the user may view the reveal video.

At 314, the e-gift ordering application 104 generates a reveal video in accordance with information provided by the user of the computing device at 302 through 310. At 316, the e-gift ordering application 104 transmits the reveal video/ e-gift combination to the recipient. The e-gift ordering application 104 transmits the reveal video/e-gift combination to the user via any suitable digital format, such as via an e-mail message, via a short message service (SMS) message, or via a social media account.

The process described above is performed repeatedly for additional reveal video/e-gifts to be sent to one or more recipients. When use of the e-gift ordering application 104 is no longer needed or desired, the process ends.

FIG. 4 illustrates an example process that is performed by the user application 152 of the computing device 114 of the recipient to play the customized reveal video according to the teachings of the present disclosure.

Figure 16:
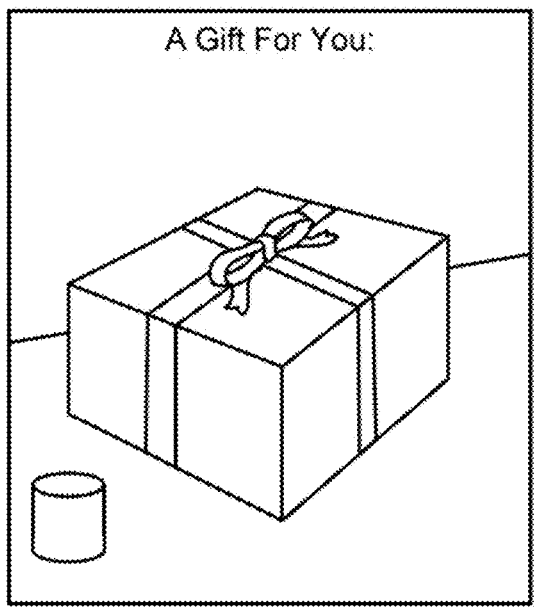
FIGS. 16-18 illustrate an example reveal video comprising a three-dimensional image of a present that is interactively opened by the recipient according to an aspect of the e-gift ordering system.
Figure 17:
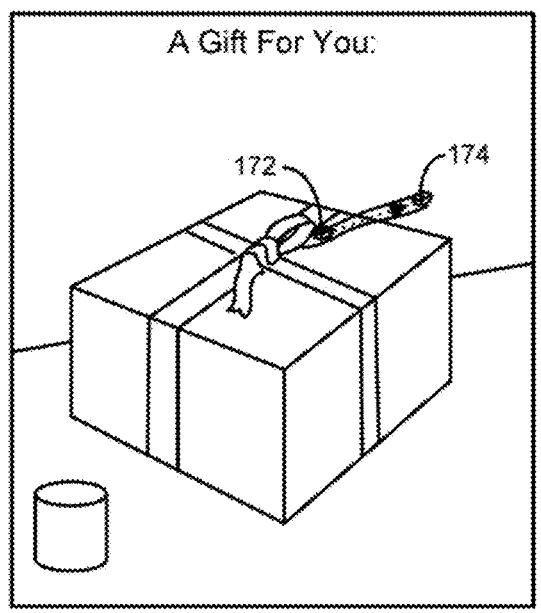
Figure 18:
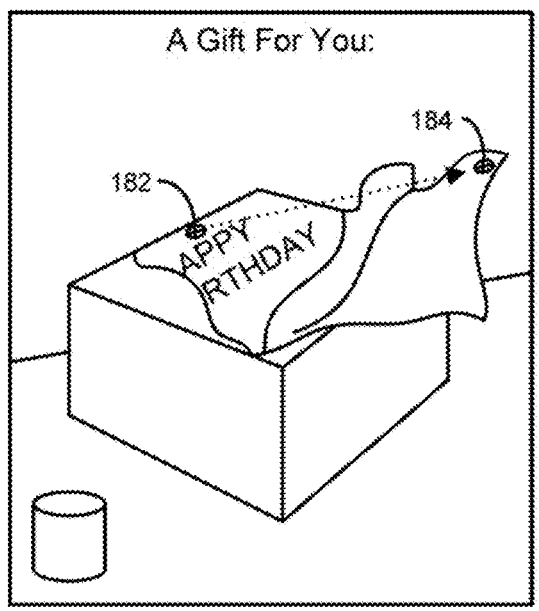
Figure 19:
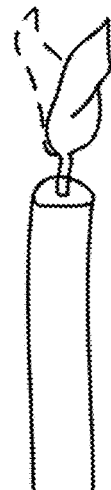
FIGS. 19-21 illustrate an example reveal video comprising an image of a birthday candle that may be interactively blown out by the recipient according to an aspect of the e-gift ordering system.

At 402, the user application 152 displays the reveal video on the GUI 148 of the computing device 114. One example reveal video may display a three-dimensional image of a present (FIGS. 16-18) to be interactively opened by the recipient. Another example reveal video may display an image of a birthday candle (FIGS. 19-21) that may be interactively blown out by the recipient. Another example reveal video may display an image of a balloon (FIGS. 22-23) to be blown up by the recipient. Yet another example reveal video may display an image including confetti or other celebration material (FIGS. 24-26) that may be removed to reveal the e-gift given to the recipient. In one embodiment, the reveal video may include background imagery, such as an image of a table on which a gift box is placed as shown in FIGS. 16-18. Additionally, the displayed image may include simulated movement, such as the birthday candle whose flame may flicker to simulate movement due to the ambient forces of the wind as shown in FIG. 19.

At 404, the user application 152 detects one or more input actions performed on the GUI 148. Examples of input actions may include, for example, finger swiping actions performed on the GUI 148 of the computing device 114, audible sound inputted into a microphone of the computing device 114, shaking, tilting, popping, and/or tapping of the computing device 114.

At 406, the user application 152 generates tactile feedback actions in accordance with the detected input actions. For the example reveal video shown in FIGS. 16-18, tactile feedback actions include an image of a ribbon that is pulled in response to an input action comprising a finger swiping action from point 172 to point 174 on the GUI 148. Additionally as shown in FIG. 18, a tactile feedback action may include an image of wrapping paper being ripped from the e-gift in response to an input action comprising a finger swiping action from point 182 to point 184 on the GUI 148.

Other tactile feedback actions may include sounds outputted by a speaker or other sound generating device of the computing device 114 that mimics or simulates an actual sound generated by visual displays on the GUI 148. For example, the user application 152 may generate a tearing sound as the wrapping paper is pulled from the e-gift as shown in FIG. 18. Additionally, the user application 152 may generate vibrations of the computing device 114 to simulate texture or other sensory aspect of the displayed image. For example, the user application 152 may generate vibrations as the wrapping paper is removed to simulate the tearing action in the user's hand.

Figure 20:
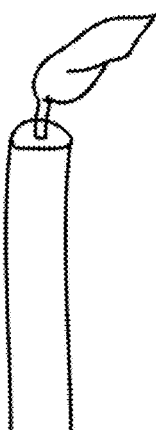
Figure 21:
Figure 22:
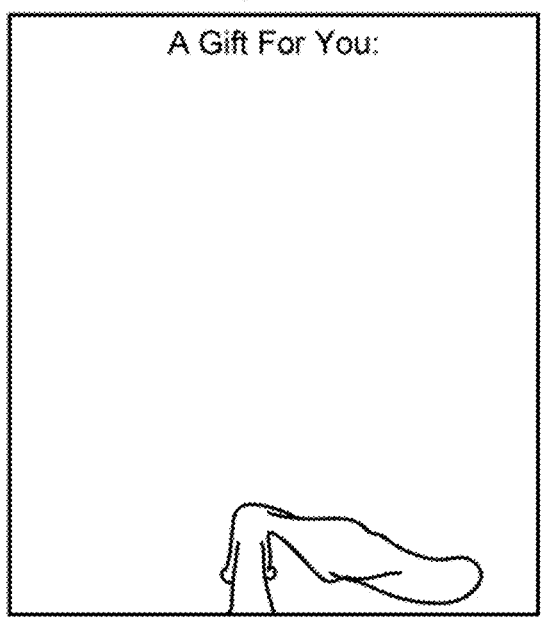
FIGS. 22-23 illustrate an example reveal video comprising an image of a balloon that may be interactively blown up by the recipient according to an aspect of the e-gift ordering system.
Figure 23:
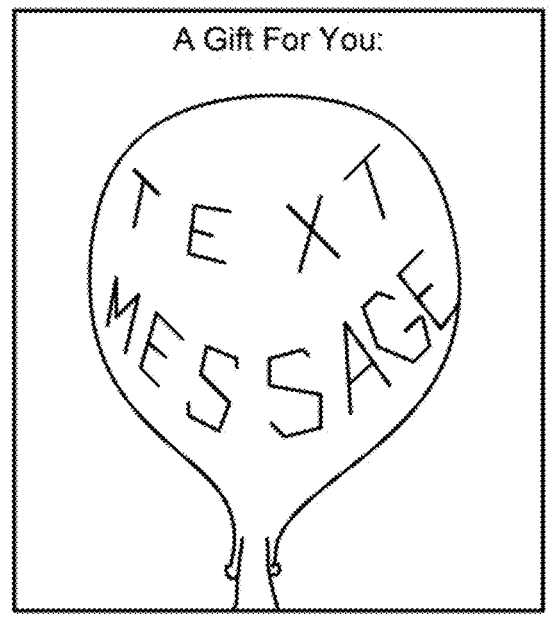
Figure 24:
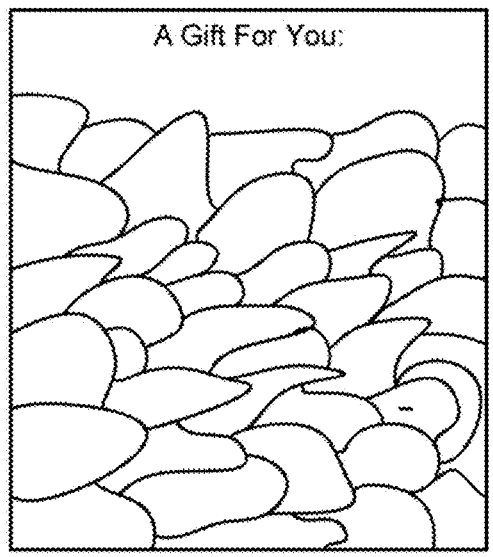
FIGS. 24-26 illustrate an example reveal video comprising an image of confetti or other celebration-based material that may be removed via haptic input movements from the recipient in order to reveal an e-gift according to an aspect of the e-gift ordering system.

Tactile feedback actions may include an image of a burning candle whose flame bends or an image of a balloon that is blown up in response to an input action of blowing into the microphone of the computing device 114 by the user as shown in FIGS. 20 and 23, respectively. As the user continues to blow into the microphone, the user application 114 responds by displaying a burned out candle as shown in FIG. 21. The balloon may also display a user-supplied text message indicating some sentiment to be conveyed to the recipient by the giver.

Figure 25:
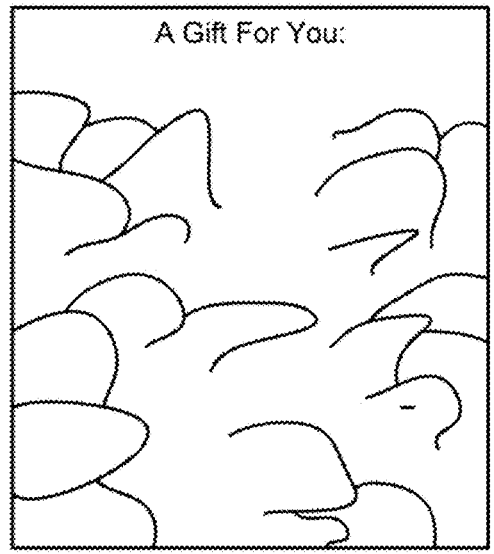

Tactile feedback actions may also include an image of confetti as shown in FIG. 25 that is removed from the GUI 148 as the user shakes the computing device 114.

Figure 26:

At 408, the user application 152 displays an image of the e-gift for the recipient. For example, an image of the e-gift may be displayed as a box that is revealed when the wrapping paper is tore away as shown in FIG. 18. As another example, an image of the e-gift may be displayed as a stored value card (e.g., a gift card) that is revealed when the candle is blown out as shown in FIG. 21, or when the confetti is shaken from the GUI 148 as shown in FIG. 26.

The process described above may be performed repeatedly for the user on the GUI 148. Nevertheless, when display of the reveal video is no longer needed or desired, the process ends. It should be appreciated that the steps described herein is provided only as an example of a process that is performed by the user application 152 to display a reveal video on the computing device 114 of the recipient and that the user application 152 may perform fewer, more, or different types of steps than those described herein. For example, the user application 152 may perform multiple steps described above as a single step. As another example, certain steps described herein is performed by other components of the computing device 114 of the recipient.

According to another embodiment of the systems and methods disclosed herein, the e-gift ordering system 100 can be used for purchasing electronic vouchers (e-vouchers) to be given to a recipient from a user in which each e-voucher is redeemable for a specific product or service provided a merchant. Examples of such products or services may include frozen drinks, coffee, dinner at a particular restaurant, one or more food items (e.g., all-you-can-eat pancakes, ice cream cones, burritos, appetizers, etc.) at a restaurant, books, and the like. Examples of such services may include hand manicures, oil changes to a vehicle, dry cleaning services, and the like.

Within this disclosure, an e-voucher may include any type of moniker, icon, or other visual structure representing a voucher to be used for conducting a transaction for a specific product or service. In one embodiment, an indication of the product or service may be displayed on the e-voucher. For example, the e-voucher may include an alpha-numeric date or other machine readable indicia (e.g. barcode or Quick Response Code ("QR code) indicating the product or service associated with the e-voucher and the merchant that the product or service is to be redeemed from. As another example, the e-voucher may include an image or a picture associated with a product or service, such as an image of a cup of coffee to be redeemed for an actual cup of coffee at a merchant that sells coffee to its patrons.

Similar to the previously described method as described above with reference to FIG. 3, at 302 through 306, the e-gift ordering application 104 receives a request from a computing device 108 to generate a GUI on the computing system 108 of the user, receives information associated with the user, and receives information associated with a recipient, respectively.

Figure 27:
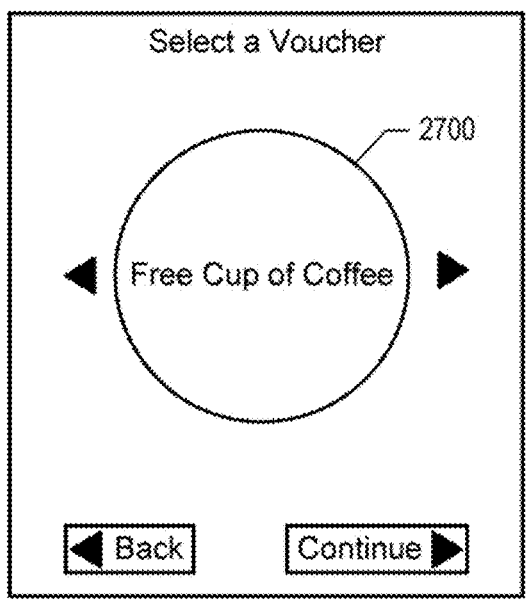
FIG. 27 illustrates an example of an e-voucher selection screen of a user interface according to an aspect of the e-gift ordering system.

Thereafter at 308, the e-gift ordering application 104 receives e-gift information from the computing device 108 in which the e-gift comprises an e-voucher. For example, the e-gift ordering application 104 may present an e-voucher selection screen (FIG. 27) for selection of an e-voucher 2700 from among multiple available e-vouchers by the user. As shown, the e-voucher 2700 represents a token coin that can be redeemed for a particular product or service provided by the merchant. In other embodiments, the e-voucher may represent any suitable type of voucher, such as an account voucher, a coupon, a food stamp, a meal voucher, and the like.

Figure 28:
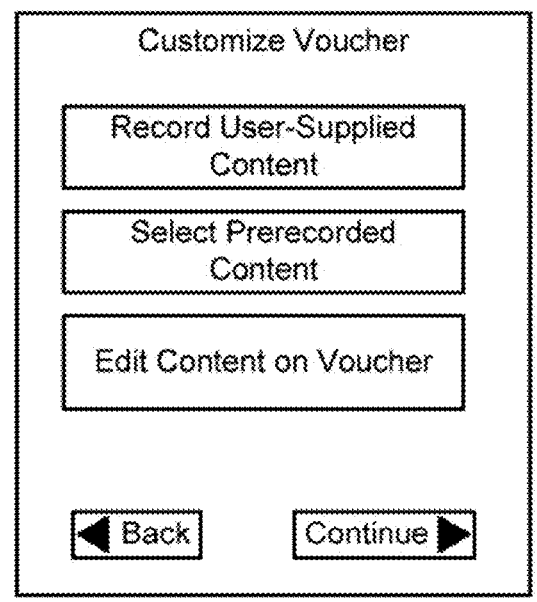
FIG. 28 illustrates an example of an e-voucher customization screen of a user interface according to an aspect of the e-gift ordering system.

According to aspects of the present disclosure, the e-gift ordering application 104 may also receive user-supplied content for personalizing the e-voucher to be given to a recipient. For example, the e-gift ordering application 104 may receive user-supplied information associated with the recipient, such as a photograph of the recipient, alpha-numeric text information associated with the recipient's name, a term of endearment known between the user and the recipient, and the like. To obtain the user-supplied content, the e-gift ordering application 104 may generate a voucher customizing screen (FIG. 28) to record user-supplied content using various input devices (e.g., microphone, camera, etc.) on the computing device of the user, receive previously recorded content, and edit the user-supplied content on the e-voucher.

Figure 29:
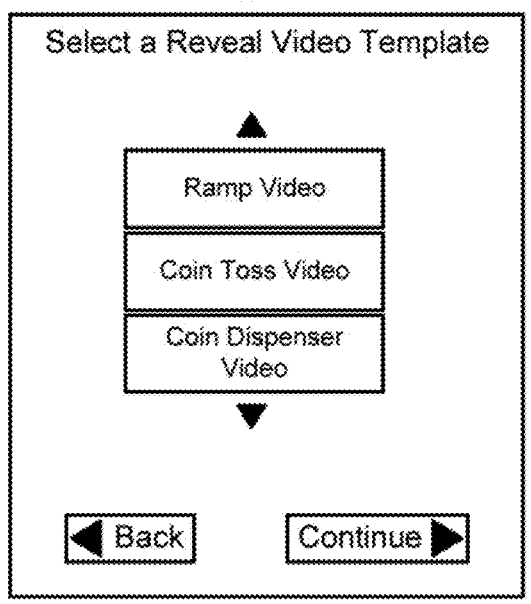
FIG. 29 illustrates an example of a reveal video selection screen of a user interface according to an aspect of the e-gift ordering system.

At 310, the e-gift ordering application 104 may optionally receive reveal video information from the computing device 108 in which the reveal video information is associated with one or more physical characteristics of a voucher represented by the e-voucher. For example, if the selected e-voucher is a token coin, the e-gift ordering application 104 may present a reveal video selection screen (FIG. 29) for entry of a particular reveal video by a user of the computing device 108. In this particular example, the reveal video selection screen includes a ramp video that is to display imagery of a selected a token coin that is rolled down one or more declining ramps, a coin toss video that is to display imagery of the selected token coin being flipped through the air, and a coin dispenser video that is to display imagery of the selected token coin being dispensed from a coin dispenser. Step 312 may be optionally performed to provide for user customization of the selected reveal video. Thereafter at 314, the e-gift ordering application 104 may generate the reveal video.

At 316, the e-gift ordering application 104 transmits the reveal video/e-voucher combination to the computing device of the recipient 114. The e-gift ordering application 104 may transmit the reveal video/e-voucher combination to the computing device of the recipient 114 via any suitable digital format, such as via an e-mail message, via a short message service (SMS) message, or via a social media account.

Figure 30:
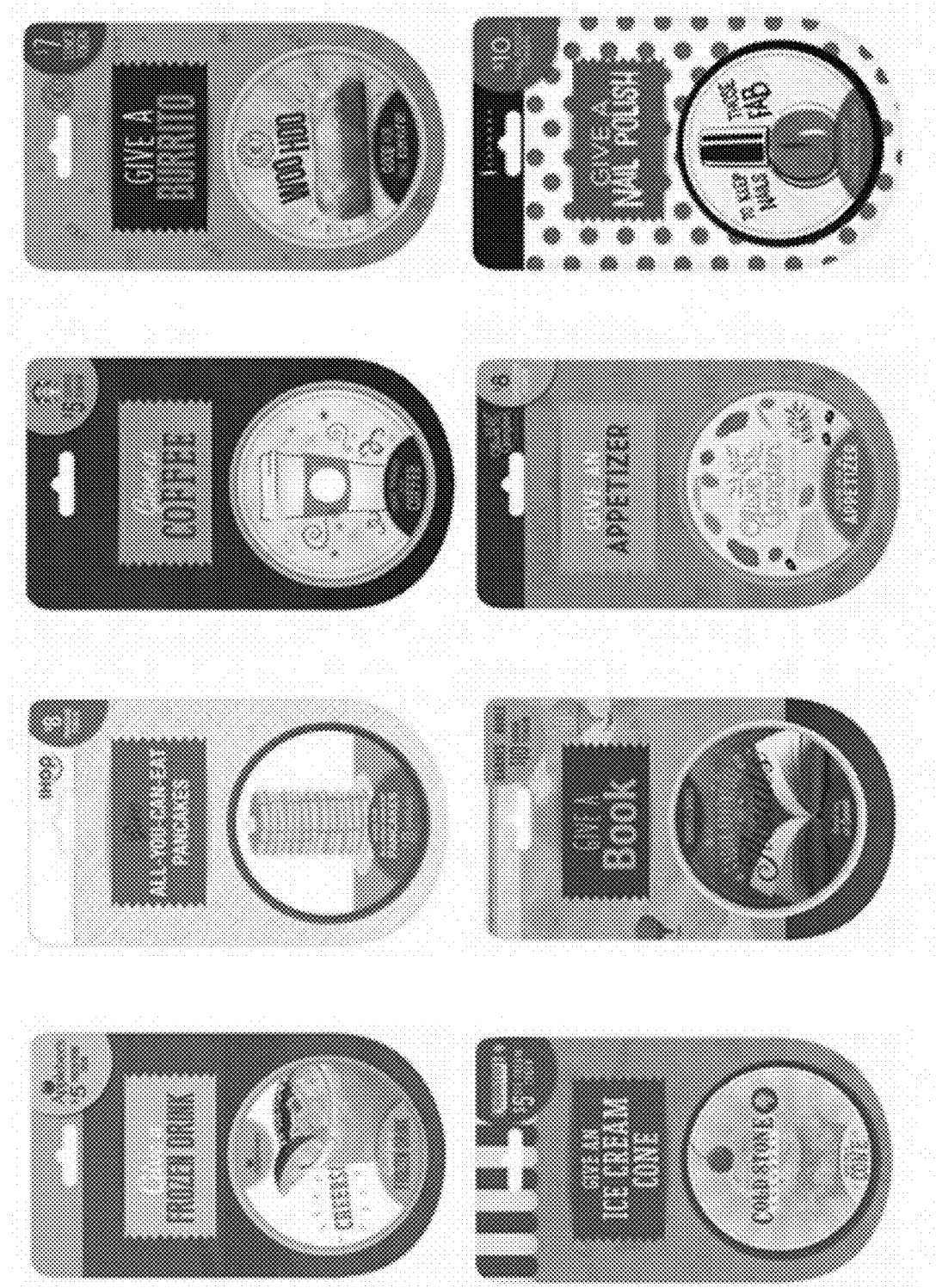
FIG. 30 illustrates various e-vouchers that may be processed by the e-gift ordering application according to an aspect of the e-gift ordering system.
Figure 31:
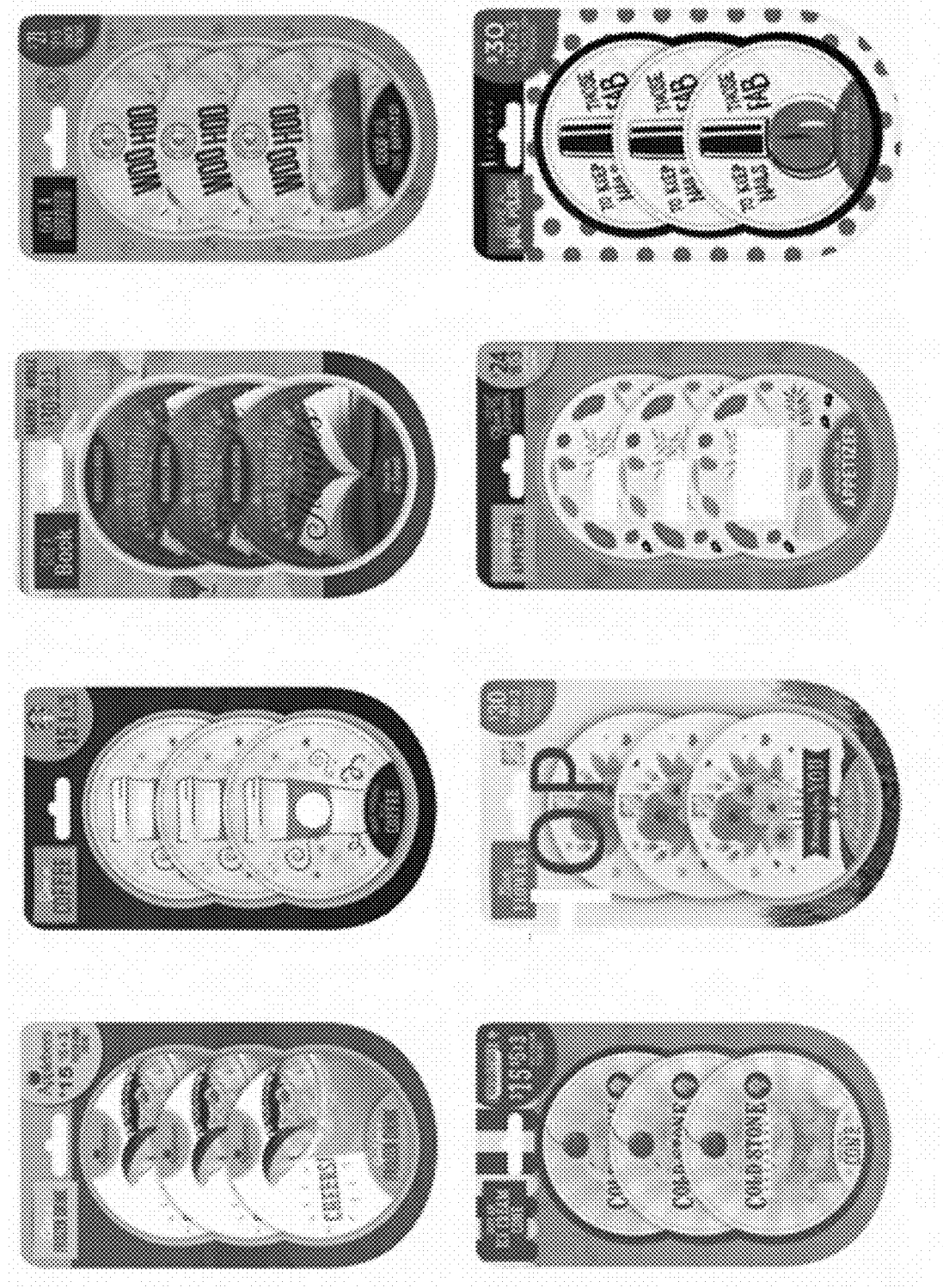
FIG. 31 illustrates various packs of e-vouchers that may be processed by the e-gift ordering application according to an aspect of the e-gift ordering system.

FIG. 30 illustrates various e-vouchers each indicating a different product or service provided by a particular merchant that can be provided by the e-gift ordering application 104. In one embodiment, the e-gift ordering application 104 may provide for the sale and gifting of packs of e-vouchers in which each pack includes multiple e-vouchers (e.g., token coins). FIG. 31 illustrates various packs of e-vouchers each indicating a different product or service that can be provided by the e-gift ordering application 104.

Figure 32A:
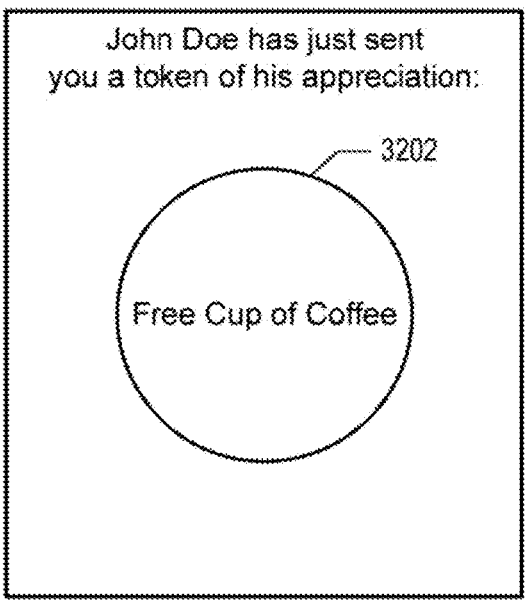
FIGS. 32A through 32C illustrate an example reveal video and associated e-voucher that may be displayed on the computing device of the recipient according to one embodiment of the present disclosure.
Figure 32B:
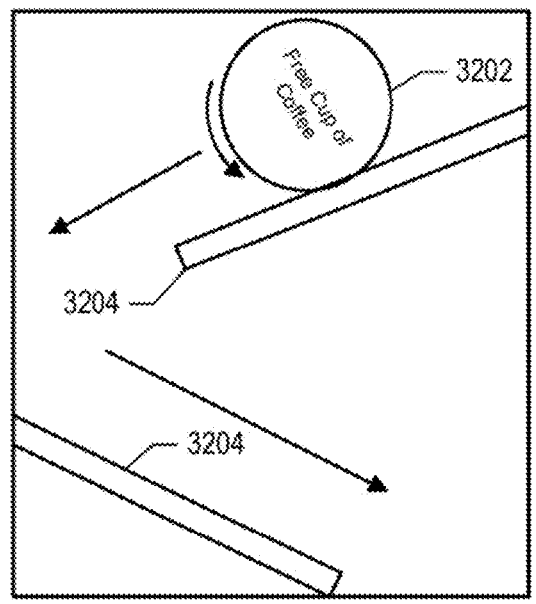
Figure 32C:
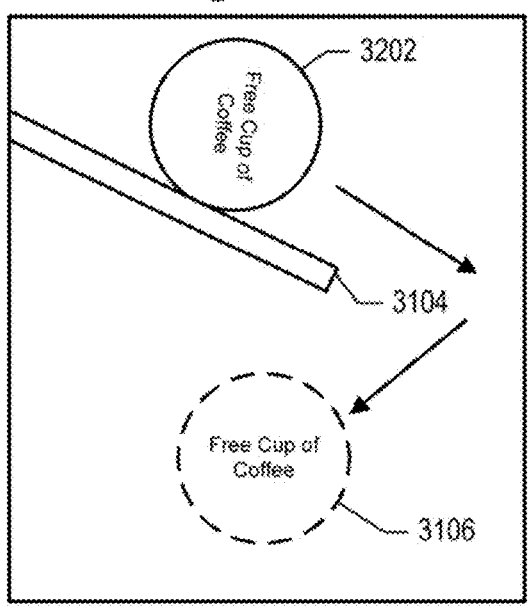

FIGS. 32A through 32C illustrates an example reveal video and associated e-voucher that may be displayed on the computing device of the recipient 114 according to one embodiment of the present disclosure. In particular, FIGS. 32A-32C illustrate a sequence of screenshots showing an animated reveal video in which an e-voucher 3202 is rolled down a series of declining ramps 3204 and comes to rest at a final point on the screen 3206 in FIG. 32C. As shown, the reveal video includes features (e.g., declining ramps) to simulate action by the physical characteristics (e.g., round shape) of the e-voucher 3202. In other embodiments, the reveal video may include other features that can be associated with certain characteristics of a voucher represented by the e-voucher. For example, if the e-voucher is to be redeemed for an oil change service, the reveal video may include animation showing a car or other automobile zooming into the screen. As another example, if the e-voucher is to be redeemed for cotton candy at a circus, the reveal video may include an animation of a clown performing a magic trick to produce an image of cotton candy on the GUI 148.

In one embodiment, the e-voucher may include location information associated with a particular location or geographical region where the e-voucher may be redeemed. For example, the system 100 may obtain location information about the user, such as a city where the user is located at, and based on the location information, search for certain merchants within a specified distance, or a geographical region, and display offering for those merchants on the GUI 148. As another example, if the merchant associated with the e-voucher is a chain store having multiple retail stores, the location information may include constraints that the e-voucher only be redeemed within a location specified by the location information. Given this example, a user may purchase an e-voucher to be used by the recipient while on vacation at a remote location. Thus, the e-voucher may be restricted to being redeemed at the remote location specified by the location information.

When the value of the e-voucher is determined based, at least in part, on the geographic location of the desired location for redemption, the redemption of the voucher may be restricted to that particular location. In one aspect, this restriction or "geo-fencing" is accomplished by receiving information from a GPS component, Internet Protocol ("IP") address or other location identifying information retrievable from the recipient's computer or mobile computing device.

The e-voucher may be redeemed in any suitable manner. In one embodiment, the e-gift ordering application 104 may include a button on the GUI 148 of the computing device 114 of the recipient such that when selected, causes identifying information about the e-voucher to be displayed. In another embodiment, the e-voucher may include a contactless, stored value smart card, such as a one regional card for all (ORCA™) e-voucher provided by the public transportation authority of Puget Sound, Wash. state.

In one embodiment, the GUI 148 of the computing device of the recipient 114 may be embodied as a mobile application (e.g., a mobile app) that stores and organizes one or more e-vouchers to be redeemed in an on-demand manner by the recipient 114. For example, the mobile app may store multiple e-vouchers associated with a particular food item sold by a restaurant such that, each time the recipient dines at that restaurant, each of the multiple e-vouchers may be redeemed for one serving of that food item for consumption of the recipient.

The process described above may be performed repeatedly for the user on the GUI 148. Nevertheless, when display of the reveal video and associated e-voucher has been performed, the process ends. It should be appreciated that the steps described herein is provided only as an example of a process that is performed by the e-gift ordering application 104 to manage gifting of e-vouchers from users to recipients, the e-gift ordering application 104 may perform fewer, more, or different types of steps than those described herein. For example, the e-gift ordering application 104 may perform multiple steps described above as a single step. As another example, certain steps described herein are performed by other components, such as by the computing device 114 of the recipient.

It should be understood that the e-gifts described herein above merely represent example e-gifts that is used with the present disclosure, and that other types or styles of e-gifts is used. For example, the e-gift may be printable on a conventional piece of paper that includes indicia indicating information, such as a merchant and the monetary amount allocated to that e-gift that may be redeemed by the merchant.

Figure 33A:
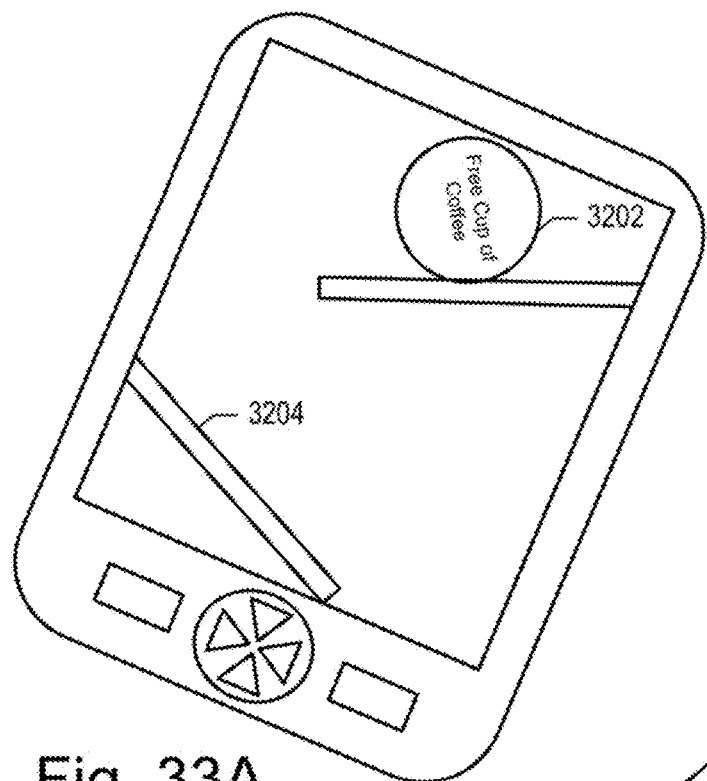
FIGS. 33A and 33B illustrate an example display that may be generated on the receiver's computing device according to one embodiment of the present disclosure.
Figure 33B:
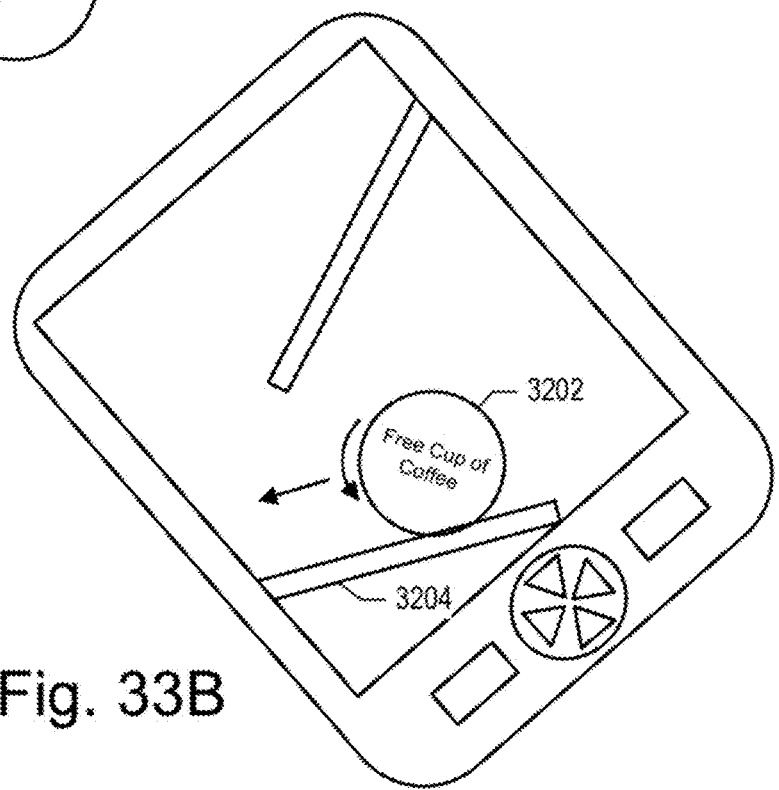

According to one embodiment, the application 104 manipulates (e.g., modifies) the e-voucher 3202 or an environment in which the e-voucher 3202 is displayed according to information obtained from one or more sensors, including but not limited to GPS components or an accelerometer of the recipient computing device 114. For example, as shown in FIGS. 33A and 33B, the application 104 may manipulate the movement of the e-voucher 3202 according to how the recipient computing device 114 is rotated from side to side. In FIG. 33A, the movement of the e-voucher 3202 is halted due to rotation of the recipient computing device 114 such that one of the declining ramps 3204 are in a horizontal orientation. Additionally, the movement of the e-voucher 3202 may be caused to move backwards when one of the declining ramps 3204 are oriented in a reverse declining orientation. To provide such an action, the application 104 may obtain orientation information from one or more sensors configured on the recipient computing device 114.

Although one example of a technique for manipulating or otherwise modifying the e-voucher 3202 is displayed according to information obtained from one or more sensors configured on the recipient computing device 114, it is contemplated that other embodiments may include other types of movement of the e-voucher 3202 or an environment in which the e-voucher 3202 is displayed without departing from the spirit or scope of the present disclosure. For example, the declining ramps 3202 may be configured to move or shake as a result of a shaking motion imparted by a user of the recipient computing device 114. In this case, the application 104 may obtain movement information from a sensor configured on the recipient computing device 114 (e.g., a accelerometer) and manipulate the movement of the declining ramps 3202 based upon this information.

As another example, the application 104 may be responsive to audio information obtained from the microphone of the recipient computing device 114 to manipulate how the fire created by one or more candles are blown out by the recipient. (See FIGS. 12-21). In this case, the application 104 may obtain audio information from the microphone and based upon the amplitude (e.g., volume) of audio information, determine how quickly the fire on the candle is blown out.

As yet another example in which the environment includes a snow globe, the application 104 may be responsive to a shaking movement of the recipient computing device 114 to agitate glitter on the display of the recipient computing device 114, and when the shaking has ceased, display an e-voucher or other indication of a gift for the recipient.

In one embodiment, the application 104 may generate haptic feedback (e.g., mechanical forces) on the recipient computing device 114 based upon information obtained from one or more sensors configured on the recipient computing device 114. In general, haptic feedback may be considered to be an environment that the e-voucher 3202 is displayed in. For example, the recipient computing device 114 may be controlled to vibrate when certain actions are performed on the recipient computing device 114, such as touching a certain region of the display of the recipient computing device 114.

Figure 34A:
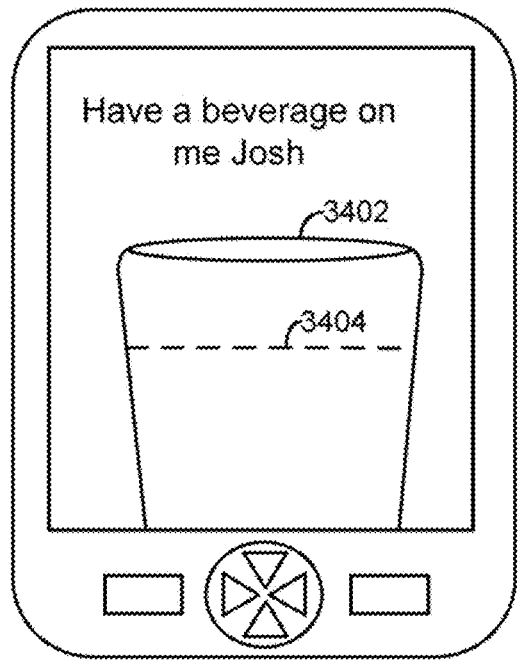
FIGS. 34A through 34D illustrate an example display that may be generated by the system to reveal an e-voucher according to one embodiment of the present disclosure.
Figure 34B:
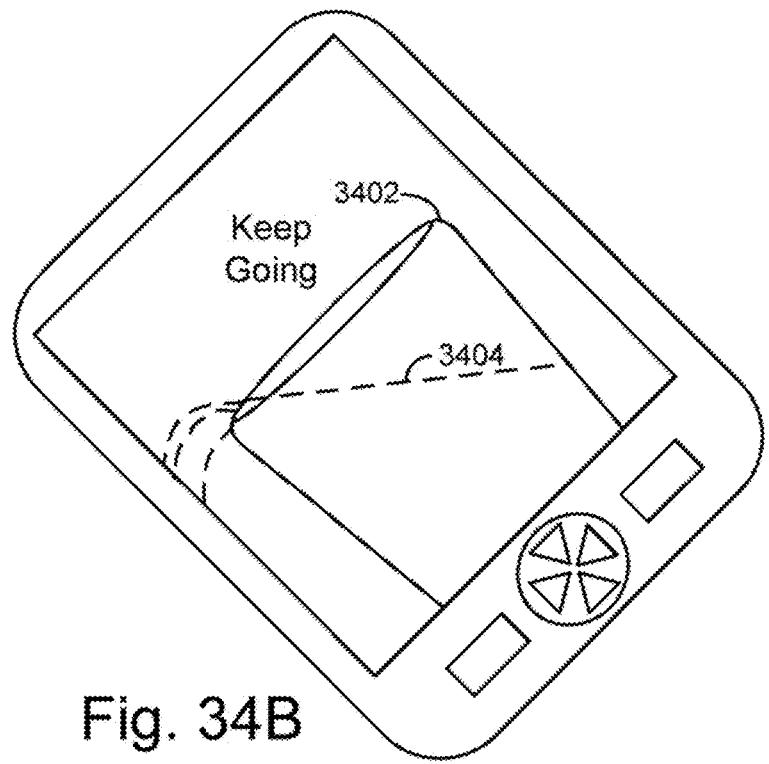
Figure 34C:
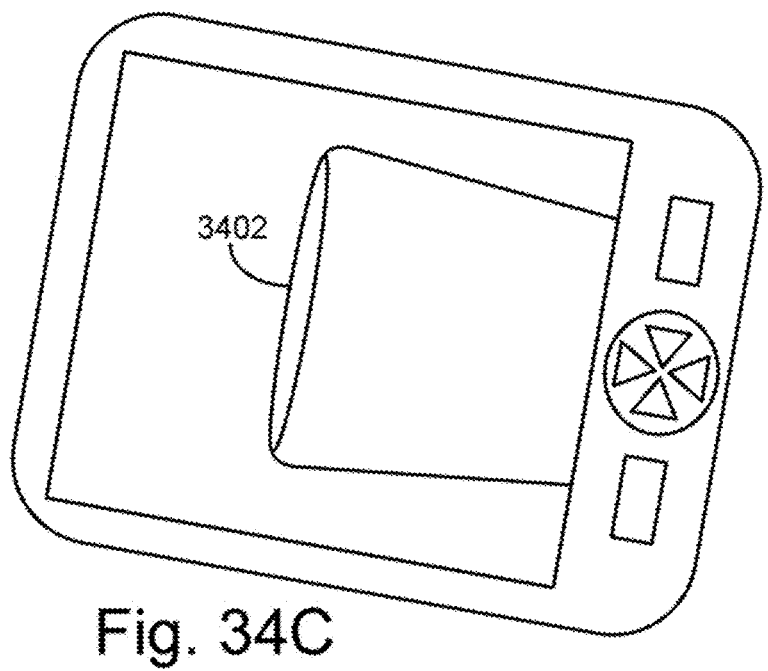
Figure 34D:
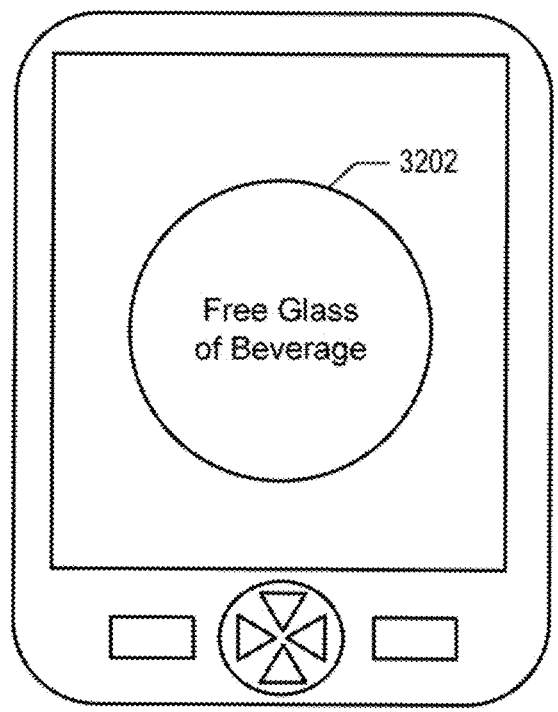

FIGS. 34A through 34D illustrate an example display that may be generated by the application 104 to reveal an e-voucher 3202 according to one embodiment of the present disclosure. In FIG. 34A, the application 104 initially displays a glass 3402 that is mostly full of a beverage 3404. In FIG. 34B, the application 104 is responsive to a tilting motion of the recipient computing device 114 to display the beverage 3404 being poured from the glass 3402. As the recipient computing device 114 is tilted to the horizontal orientation, the application 104 may display the glass 3402 as being completely emptied as shown in FIG. 34C. Thereafter in FIG. 34D, when the recipient computing device 114 is tilted back to the vertical orientation, the e-voucher 3202 may be revealed to show the recipient has been given an e-voucher to a beverage. Thus as shown, the application 104 may be responsive to orientation information obtained from a sensor configured on the recipient computing device 114 to manipulate the environment in which the e-voucher 3202 is displayed.

In one embodiment, the application 104 may display the environment in multiple layers in which a first layer is static (e.g., does not move) while a second layer is manipulated according to one or more sensors configured on the recipient computing device. For example, as shown in FIGS. 34A through 34D, the display may have a first layer that includes the glass 3402 and text information, and a second layer that includes the pourable fluid (e.g., beverage) 3404. The first layer is shown with solid lines while the second layer is shown with dashed lines. The application 104 may be responsive to a sensor (e.g., an accelerometer, gyroscope, etc.) configured on the recipient computing device 114 to increase the flow rate from the glass 3402 proportionally to an angle of deviation from the upright position of the recipient computing device 114. Thus, the flow rate of the beverage from the glass may be proportional to how much tilt is provided by the recipient on the recipient computing device 114.

Those skilled in the art will appreciate that variations from the specific embodiments disclosed above are contemplated by the invention. The invention should not be restricted to the above embodiments, but should be measured by the following claims.

What is claimed is:

1. A system for generating an interactive reveal video, the system comprising:
    a first computing device comprising at least one processor; and
    at least one memory storing an application executed by the at least one processor to:
        receive, by the first computing device, voucher information associated with an electronic voucher (e-voucher) to be given to a recipient from a second computing device,
        wherein the e-voucher is redeemable for a specified product or service provided by a merchant, and comprises alphanumeric data identifying the specified product or service and location information associated with the geographic location of the second computing device,
        wherein the e-voucher is only redeemable within the geographic location of the second computing device;
        receive, by the first computing device, user-supplied content related to the recipient, wherein the user-supplied content comprises personalized multimedia content generated by the user and intended for the recipient;
        generate, by the first computing device, the e-voucher in accordance with the voucher information and the user-supplied content; and
        generate a multimedia display comprising the generated e-voucher and a graphical environment, at the first computing device, for transmission to a recipient computing device, the multimedia display comprising the e-voucher and imagery associated with the specified product or service and the user-supplied content;
        receive, via the first computing device, haptic feedback intensity parameters for customizing haptic feedback for the recipient,
        wherein the application is further executed to generate the haptic feedback according to the information obtained from one or more sensors of the second computing device,
        wherein the haptic feedback changes in response to an intensity of an input from the recipient obtained from the one or more sensors of the second computing device as defined by the feedback intensity parameters input at the first computing device.

2. The system of claim 1, wherein the at least one processor renders, at the first computing device, a reveal video template for display and wherein the first computing device receives reveal video information from the second computing device, the reveal video information including the user-supplied content related to the recipient and wherein the user-supplied content includes alpha-numeric text, photographs, audio content, video content, pre-recorded video content, animated content, or combinations thereof.

3. The system of claim 1, wherein the at least one processor renders a personalized interactive reveal video comprising the user-supplied content composited into one or more editable fields of the reveal video template, wherein the personalized interactive reveal video that receives two or more user interface input actions and generates two or more tactile feedback actions to be performed at a recipient computing device in response to the user interface input action during display of the personalized interactive reveal video.

4. The system of claim 1, wherein the graphical environment comprises a reveal video displayed on the recipient computing device, the reveal video having a structure that is related to one or more physical characteristics of a voucher represented by the e-voucher.

5. The system of claim 1, wherein the application is further executed to generate audio sound on the recipient computing device according to the information obtained from one or more sensors of the computing device.

6. The system of claim 1, wherein the application is further executed to determine how quickly a candle rendered in the graphical environment is blown out according to audio information obtained from a microphone of the recipient computing device.

7. The system of claim 1, wherein the application is further executed to determine how a beverage is emptied from a glass rendered in the graphical environment according to movement information obtained from one or more sensors of the computing device.

8. The system of claim 7, wherein the sensors comprise at least one of an accelerometer or a gyroscope.

9. The system of claim 1, wherein the application is further executed to determine how a plurality of flakes of a snow globe rendered in the graphical environment are displayed according to shaking information obtained from one or more sensors of the computing device.

10. A method for generating an interactive reveal video, the method comprising:
    receiving by a first computing device, using instructions stored on at least one memory and executed by at least one processor of the first computing device, voucher information associated with an electronic voucher (e-voucher) to be given to a recipient from a second computing device, wherein the e-voucher is redeemable for a specified product or service provided by a merchant by the first computing device,
    wherein the voucher information includes location information indicative of a geographic location of the second computing device,
    wherein the e-voucher is selected on the first computing device from a plurality of e-vouchers,
    wherein the plurality of e-vouchers is associated with offerings from a plurality of merchants from the geographical region of the second computing device;
    receiving, using the instructions, user-supplied content related to the recipient, wherein the user-supplied content comprises personalized multimedia content generated by the user and intended for the recipient;
    generating, by the first computing device, the e-voucher in accordance with the voucher information and the user-supplied content;
    generating, via the first computing device, haptic feedback intensity parameters for customizing haptic feedback for the recipient and generating a multimedia display comprising the generated e-voucher and a graphical environment, by the first computing device to be rendered for display at a recipient computing device, the multimedia display comprising the e-voucher and imagery associated with the specified product or service and the user-supplied content, generating, the haptic feedback according to the information obtained from one or more sensors of the recipient computing device and the haptic feedback intensity parameters, wherein the haptic feedback changes in response to an intensity of an input from the recipient obtained from the one or more sensors of the computing device.

11. The method of claim 10, further comprising:
generating, at the first computing device, a reveal video template for display; and
receiving reveal video information, at the first computing device from the second computing device, the reveal video information including the user-supplied content related to the recipient and wherein the user-supplied content includes alpha-numeric text, photographs, audio content, video content, pre-recorded video content, animated content, or combinations thereof.

12. The method of claim 10, further comprising generating, by the first computing device, a personalized interactive reveal video comprising the user-supplied content composited into one or more editable fields of the reveal video template, wherein the personalized interactive reveal video that receives two or more user interface input actions and generates two or more tactile feedback actions to be performed at a recipient computing device in response to the user interface input action during display of the personalized interactive reveal video.

13. The method of claim 10, wherein the displayed graphical environment comprises a reveal video displayed on the recipient computing device, the reveal video having a structure that is related to one or more physical characteristics of a voucher represented by the e-voucher.

14. The method of claim 10, further comprising generating audio sound on the recipient computing device according to the information obtained from one or more sensors of the computing device.

15. The method of claim 10, further comprising determine how quickly a candle rendered in the graphical environment is blown out according to audio information obtained from a microphone of the recipient computing device.

16. The method of claim 10, further comprising determining how quickly a beverage is emptied from a glass rendered in the graphical environment according to movement information obtained from one or more sensors of the computing device.

17. The method of claim 10, further comprising determining how a plurality of flakes of a snow globe rendered in the graphical environment are displayed according to shaking information obtained from one or more sensors of the computing device.

18. The method of claim 17, wherein the sensors comprise at least one of an accelerometer or a gyroscope.

* * * * *